(12) United States Patent
Nania

(10) Patent No.: US 9,975,412 B1
(45) Date of Patent: May 22, 2018

(54) MULTIFUNCTION DRIVE SYSTEM FOR A MOON ROOF AND OTHER APPLICATIONS

(71) Applicant: FORD GLOBAL TECHNOLOGIES, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/357,587

(22) Filed: Nov. 21, 2016

(51) Int. Cl.
*B60J 7/057* (2006.01)
*B60J 7/00* (2006.01)

(52) U.S. Cl.
CPC .......... *B60J 7/0573* (2013.01); *B60J 7/0015* (2013.01)

(58) Field of Classification Search
CPC ......... B60J 7/0573; B60J 7/0015; B60J 7/001
USPC .................... 296/214, 216.01–224
See application file for complete search history.

(56) References Cited

U.S. PATENT DOCUMENTS

| | | | | |
|---|---|---|---|---|
| 5,688,019 A | * | 11/1997 | Townsend | B60J 5/06 296/106 |
| 6,000,077 A | * | 12/1999 | Cyr | A47C 20/041 192/48.2 |
| 6,588,828 B2 | * | 7/2003 | Fisher | E05B 81/06 296/146.4 |
| 7,891,730 B2 | * | 2/2011 | Rikkert | B60J 7/0573 296/220.01 |
| 8,439,433 B2 | | 5/2013 | Kim et al. | |
| 8,690,235 B2 | * | 4/2014 | Lee | E05F 15/643 296/214 |
| 9,056,540 B2 | * | 6/2015 | Walter | B60J 7/0573 |
| 9,667,120 B2 | * | 5/2017 | Kenichi | B60J 7/0573 |
| 2009/0015088 A1 | | 1/2009 | Akopian et al. | |
| 2015/0038291 A1 | | 2/2015 | Kenichi | |

FOREIGN PATENT DOCUMENTS

| | | |
|---|---|---|
| JP | 2016125553 A | 7/2016 |
| KR | 20080051431 A | 6/2008 |

OTHER PUBLICATIONS

English Machine Translation of JP2016125553A.
English Machine Translation of KR20080051431A.

* cited by examiner

*Primary Examiner* — Dennis H Pedder
(74) *Attorney, Agent, or Firm* — Jason Rogers; King & Schickli, PLLC

(57) ABSTRACT

A moon roof system includes a moon roof, a roller shade and a multifunction drive system. That multifunction drive system includes a single drive motor including a drive shaft, a first drive link connected to a first accessory or moon roof, a second drive link connected to a second accessory or roller shade and a transmission for selectively connecting the drive shaft to the first drive link and the second drive link. A related method is also provided.

16 Claims, 6 Drawing Sheets

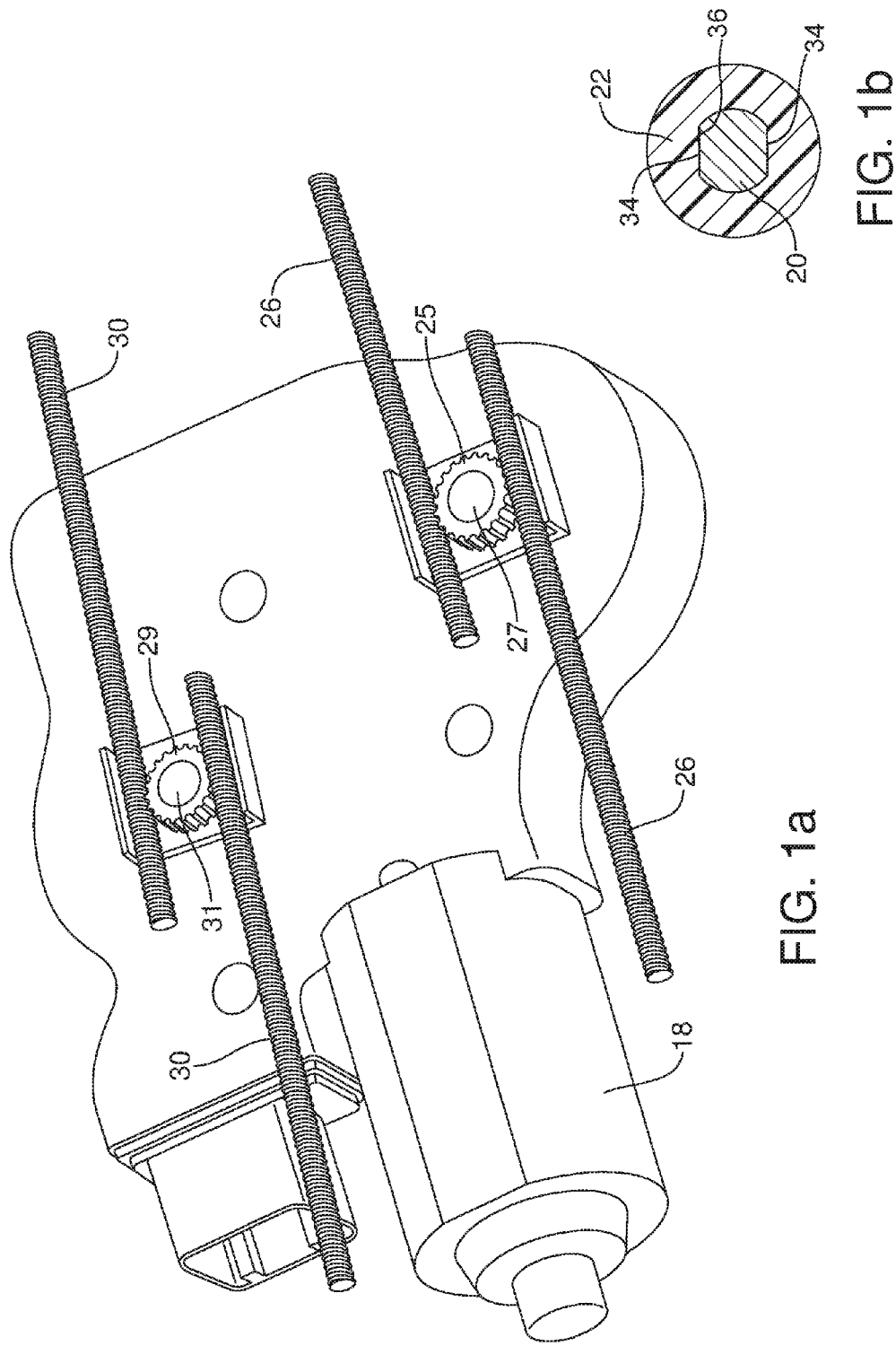

MULTIFUNCTION DRIVE SYSTEM FOR A MOON ROOF AND OTHER APPLICATIONS

TECHNICAL FIELD

This document relates generally to multifunction drive systems as well as to a moon roof system incorporating such a multifunction drive system.

BACKGROUND

A typical moon roof system in a motor vehicle requires two drive motors, one for the glass panel or moon roof and one for the roller shade or blind system. Both motors are typically packaged overhead between the headliner and the roof of the motor vehicle taking up valuable packaging space and limiting head room as well as the size of the daylight opening and hands-through opening. Sleeker and more stylish vehicles are very difficult to achieve when the motors must be accommodated over the rear seat occupants.

Multiple motors are also very costly and typically are only used one at a time. This is due to concerns with the roller shade being damaged or making noise if the glass panel or moon roof is open and the shade is closed. Thus, it is common practice to open the shade prior to opening the glass and closing the glass prior to closing the shade.

This document relates to a new and improved moon roof system incorporating a multifunction drive system wherein a single motor is used to selectively displace both the moon roof and the roller shade between their opened and closed positions. Such a system is more easily packaged in the limited available space overhead so as to improve head room and free the design to provide a sleeker and more stylish motor vehicle. As an additional bonus, the multifunction drive system may be utilized for other applications.

SUMMARY

In accordance with the purposes and benefits described herein, a multifunction drive system is provided. That multifunction drive system comprises a single drive motor including a drive shaft, a first drive link connected to a first accessory and a second drive link connected to a second accessory. The multifunction drive system further includes a transmission that selectively connects the drive shaft to the first drive link and the second drive link.

That transmission may include a first drive worm wheel connected to the first drive link, a second drive worm wheel connected to the second drive link and a sliding worm screw. The sliding worm screw is displaceable along the drive shaft between a first position in operative engagement with the first drive worm wheel and a second position in operative engagement with the second drive worm wheel.

The transmission of the multifunction drive system may further include an actuator to retain the sliding worm screw in the first position or the second position along the drive shaft. That actuator may comprise a linear actuator having a plunger with a radiused end.

Still further, the sliding worm screw may include a continuous channel and the radiused end of the plunger may engage in the continuous channel to retain the sliding worm screw in the first position. In contrast, the radiused end of the plunger may engage a terminal end of the sliding worm screw to retain the sliding worm screw in the second position.

In accordance with still another aspect, a moon roof system is provided. That moon roof system comprises a moon roof, a roller shade and a multifunction drive system. The multifunction drive system selectively displaces the moon roof between a first opened position and a first closed position and the roller shade between a second opened position and a second closed position using a single drive motor.

The multifunction drive system may further include a first drive link connected to the moon roof, a second drive link connected to the roller shade and a transmission selectively connecting a drive shaft of the single drive motor to the first drive link and the second drive link.

That transmission may include a first drive worm wheel connected to the first drive link, a second drive worm wheel connected to the second drive link and a sliding worm screw displaceable along the drive shaft between a first position in operative engagement with the first drive worm wheel and a second position in operative engagement with the second drive worm wheel.

Still further, the transmission may include an actuator to retain the sliding worm screw in the first position or the second position along the drive shaft. That actuator may comprise a linear actuator having a plunger with a radiused end.

Still further, the sliding worm screw may include a continuous channel. The radiused end of the plunger may be engaged in the continuous channel to retain the sliding worm screw in the first position. In contrast, the radiused end of the plunger may engage a terminal end of the sliding worm screw to retain the sliding worm screw in the second position.

Still further, the first drive link may comprise a first drive cable and the second drive link may comprise a second drive cable. Further, the drive shaft may include an acircular cross section and the sliding worm screw may include a complementary acircular lumen receiving and engaging the drive shaft.

In accordance with still another aspect, a method of operating a moon roof system is provided. That method comprises selectively displacing the moon roof of the moon roof system between a first opened position and a first closed position and the roller shade of the moon roof system between a second opened position and a second closed position by using a single drive motor.

Further, the method may include the step of providing a sliding worm screw on a drive shaft of the single drive motor. Still further, the method may include the step of retaining, by an actuator, the sliding worm screw at a first position along the drive shaft in order to displace the moon roof between the first opened position and the first closed position. Still further, the method may include the step of retaining, by the actuator, the sliding worm screw at a second position along the drive shaft in order to displace the roller shade between the second opened position and the second closed position. In addition, the method may include the step of shifting the sliding worm screw between the first position and the second position by releasing the actuator and rotating the drive shaft with the drive motor.

In the following description, there are shown and described several preferred embodiments of the multifunction drive system, the moon roof incorporating the multifunction drive system as well as the related method of operating a moon roof system including a moon roof and a roller shade. As it should be realized, the multifunction drive system, the moon roof system and the related method are capable of other, different embodiments and their several details are capable of modification in various, obvious aspects all without departing from the multifunction drive system, moon roof system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the multifunction drive system and moon roof system and together with the description serve to explain certain principles thereof. In the drawing figures:

FIG. 1a is a detailed perspective view of the connection of the transmission of the multifunction drive system to the first and second drive links of the multifunction drive system.

FIG. 1b is a simple cross section taken through the sliding worm screw and the drive shaft.

Reference will now be made in detail to the present preferred embodiments of the multifunction drive system and moon roof system, examples of which are illustrated in the accompanying drawing figures.

DETAILED DESCRIPTION

Figure 1:
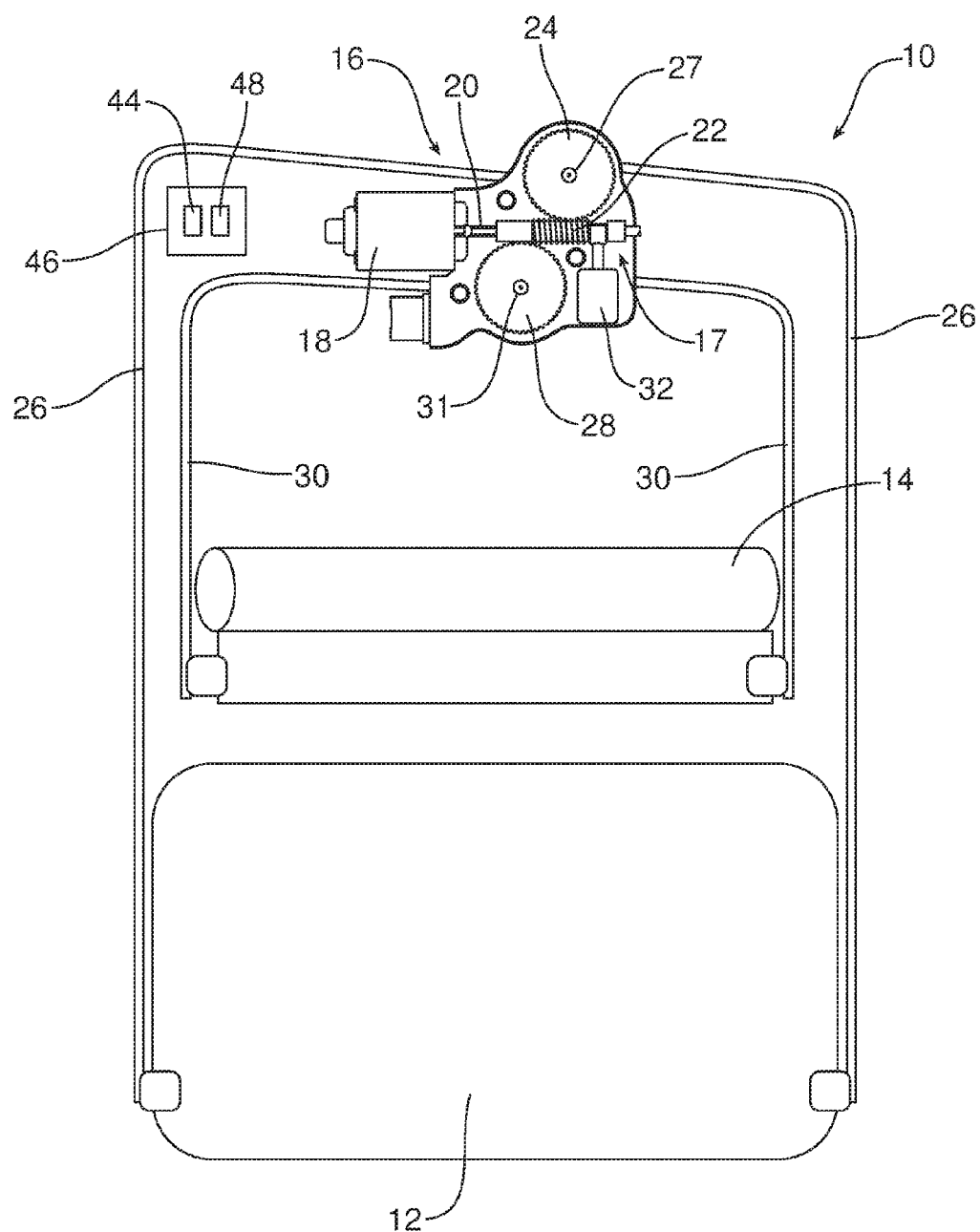
FIG. 1 is a schematic illustration of a moon roof system incorporating a new and improved multifunction drive system as well as an independently operable moon roof and roller shade.

Reference is now made to FIG. 1 which illustrates a new and improved moon roof system 10 including a moon roof 12, a roller shade 14 and a multifunction drive system 16. That multifunction drive system 16 is adapted to independently operate the moon roof 12 and roller shade 14 allowing selective displacement of the moon roof between a first opened position and a first closed position and the roller shade between a second opened position and a second closed position using a transmission 17 and a single drive motor 18.

As illustrated in FIG. 1, the multifunction drive system includes the single drive motor 18 having an elongated drive shaft 20. A sliding worm screw 22 is received over the drive shaft 20 and, as described below, is displaceable between a first position and a second position.

The multifunction drive system 16 also includes a first drive worm wheel 24 that turns a pinion 25 (note shared shaft 27) that is operatively connected to a first drive link 26, in the form of a drive cable, connected to a first accessory or in this case the moon roof 12. Further, the multifunction drive system 16 includes a second drive worm wheel 28 that turns a pinion 29 (note shared shaft 31) that is operatively connected to a second drive link 30, illustrated as a drive cable, that is connected to a second accessory or the roller shade 14. See also FIG. 1a.

Figure 2:
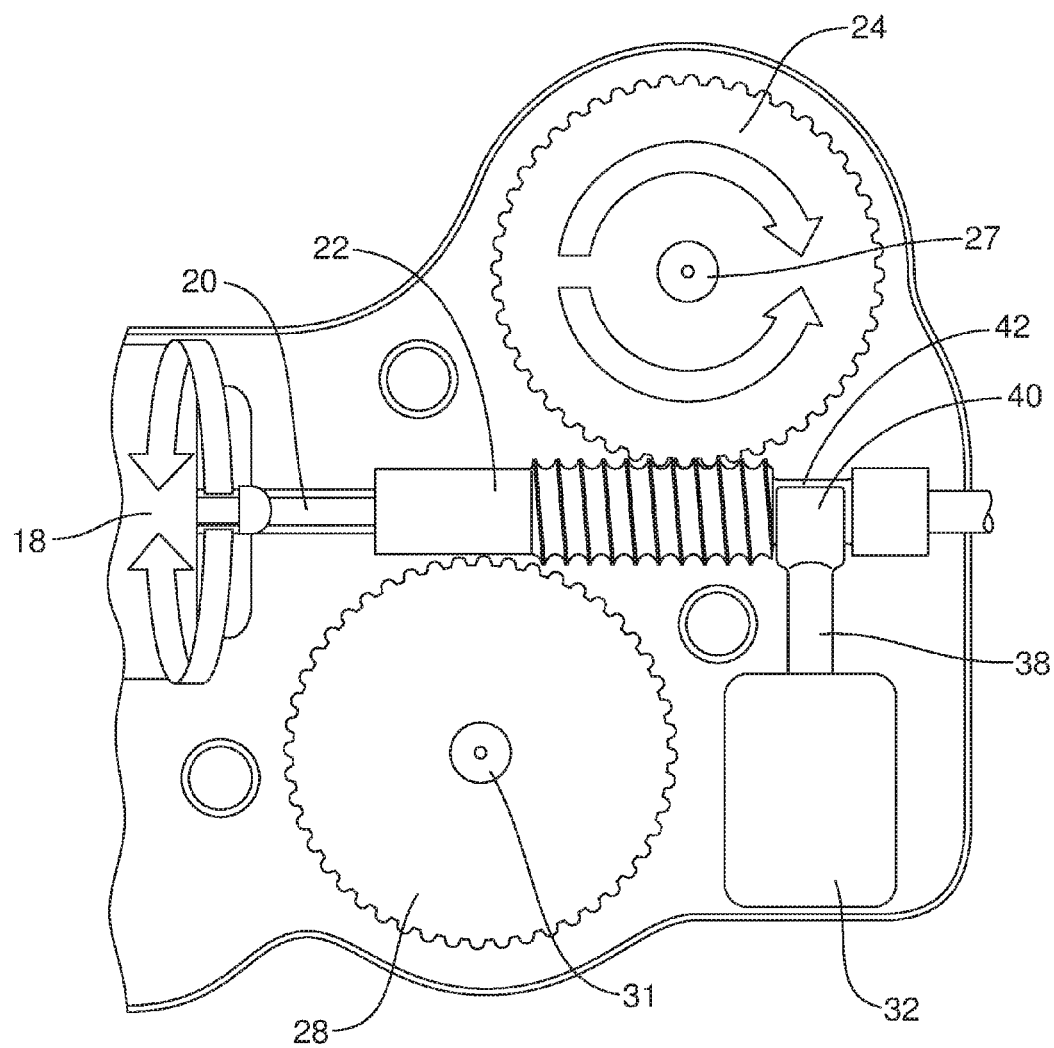
FIG. 2 is a detailed schematic view of the multifunction drive system showing the radiused end of the actuator plunger engaged in a continuous channel of the sliding worm screw and holding that sliding worm screw in engagement with a first drive worm gear which is connected to a first accessory or moon roof.
Figure 5:
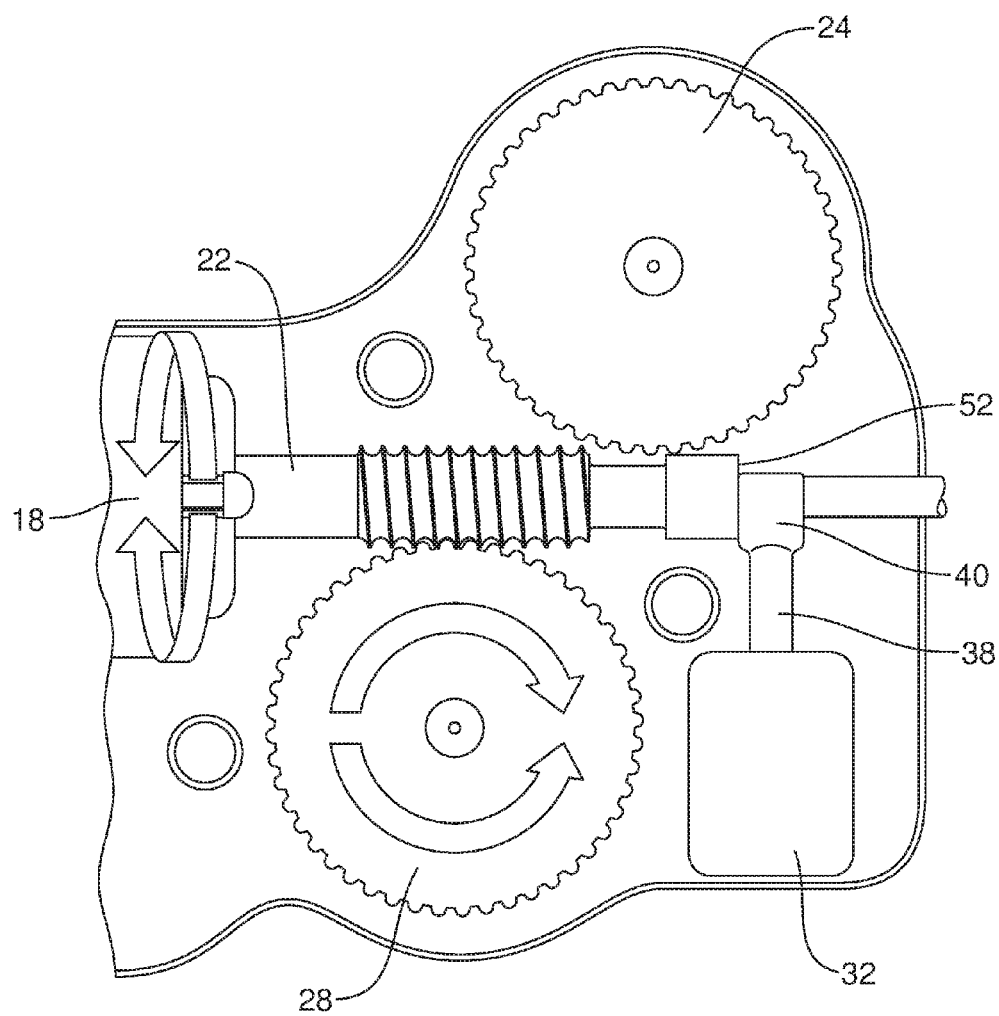
FIG. 5 is a view similar to FIGS. 2-4 but illustrating the multifunction drive system in operation to turn the second drive worm wheel connected to the second drive link.

The transmission 17 of the multifunction drive system 16 further includes an actuator 32 to retain the sliding worm screw 22 in the first position in operative engagement with the first drive worm wheel 24 as illustrated in FIG. 2 and the second position in operative engagement with the second drive worm wheel 28 as illustrated in FIG. 5. As illustrated in FIG. 1b, the elongated drive shaft 20 includes opposed flats 34 while the sliding worm screw 22 includes a complementary shaped lumen 36 that receives and engages the drive shaft so that the sliding worm screw 22 is rotated with the drive shaft but will simultaneously slide along the drive shaft in a manner described in greater detail below. Here it should be appreciated that the drive shaft 20 may include substantially any acircular cross section while the sliding worm screw includes a complementary acircular cross section providing the desired function.

FIG. 2 illustrates the multifunction drive system 16 with the sliding worm screw 22 in the first position engaging the first drive worm wheel 24. The sliding worm screw 22 is held in the first position by means of the actuator 32. More specifically, the actuator 32 includes a plunger 38 having a radiused end 40. The sliding worm screw 22 includes a continuous channel 42. The plunger 38 is extended with the radiused end 40 engaging in the continuous channel 42 on the sliding worm screw 22 in order to hold the sliding worm screw in the first position in engagement with the first drive worm wheel 24 while allowing free rotation of the sliding worm screw.

In this position, the drive motor 18 may be driven in a first direction to rotate the sliding worm screw 22 and the first drive worm wheel 24 in engagement with the first drive cable or drive link 26 and displace the moon roof 12 in a first or opening direction. In contrast, if the drive motor 18 is rotated in the opposite direction, the above-described connection of the transmission 17 to the first drive cable or drive link 26 displaces the moon roof 12 in a second or closing direction. As is known in the art, the opening and closing of the moon roof 12 may be initiated by depressing an appropriate control button 44 on the overhead console 46.

Figure 3:
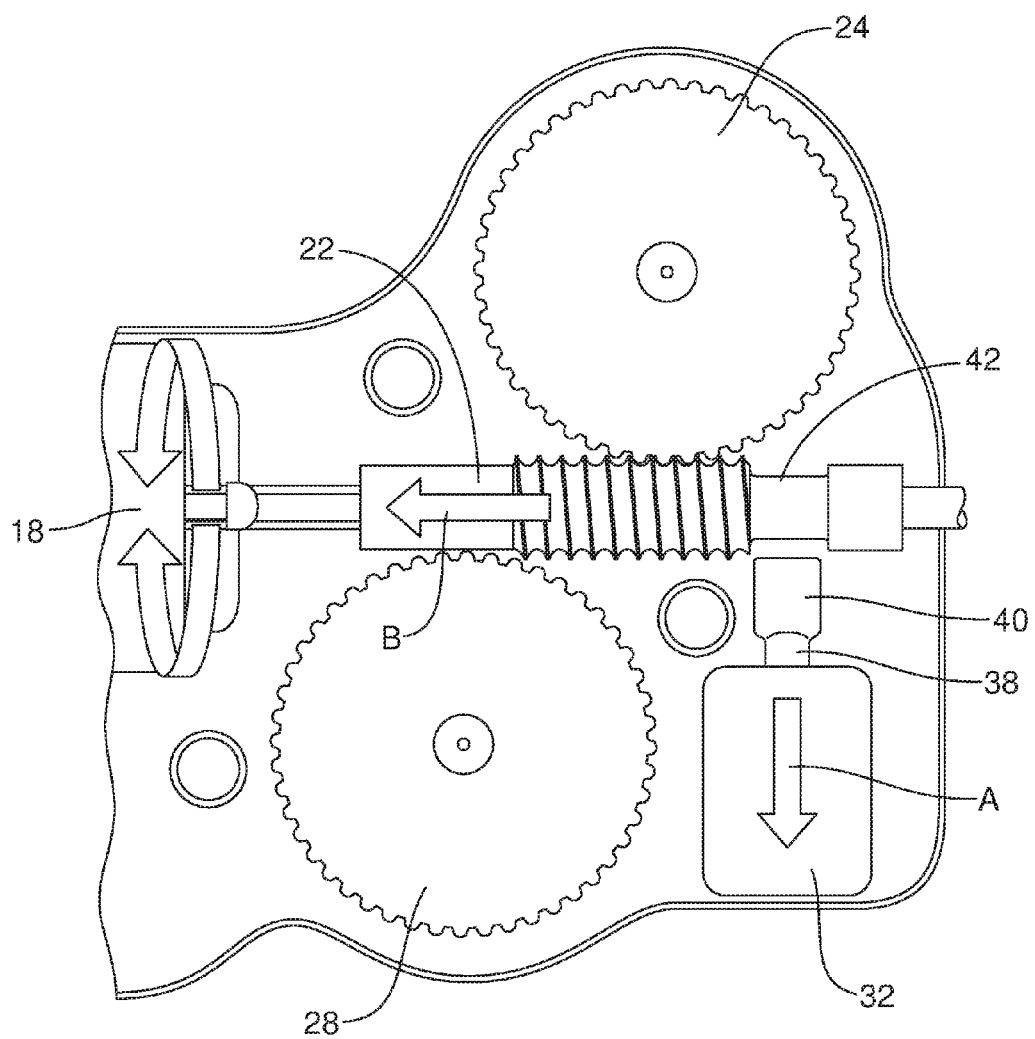
FIG. 3 is a view similar to FIG. 2 but showing the actuator disengaged from the sliding worm screw and translation of the sliding worm screw along the drive shaft of the drive motor from a position in engagement with the first drive worm gear to a position in engagement with the second drive worm gear.
Figure 4:
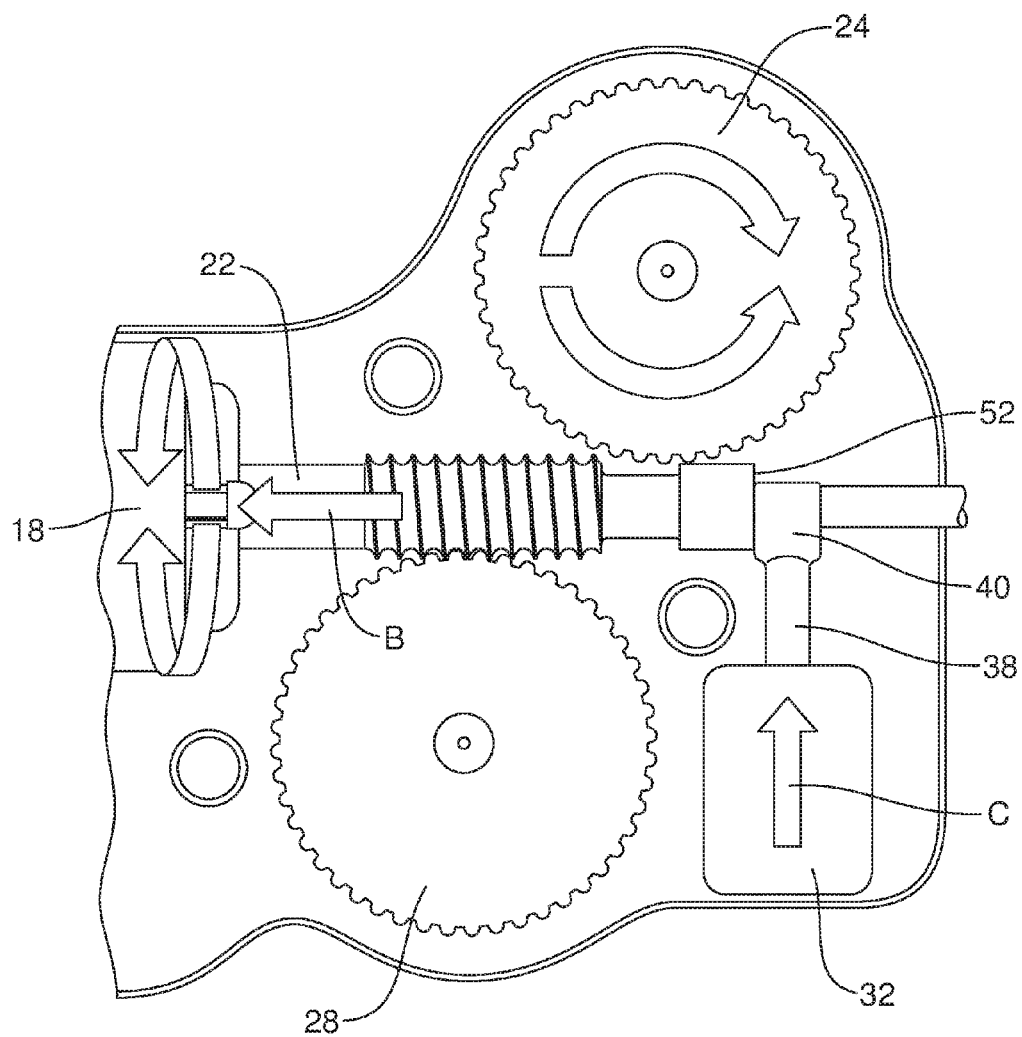
FIG. 4 is a view similar to FIGS. 2 and 3 but showing the radiused end of the actuator in engagement with the end of the sliding worm screw holding the sliding worm screw in engagement with the second drive worm gear.

When one wishes to adjust the position of the roller shade 14, one may use a control button 48 on the overhead console 46 that controls operation of the roller shade. When this is done, the plunger 38 of the actuator 32 is retracted and the radiused end 40 is withdrawn from engagement in the continuous channel 42 (see FIG. 3 and note action arrow A). The drive motor 18 is then engaged to turn the drive shaft 20 and the sliding worm screw 22 keyed thereto. The sliding worm screw 22 screws against the first drive worm wheel 24. The friction in the first drive cable/drive link 26 (that is, the friction between the drive cable and the tube it travels through) holds the first drive worm wheel 24 in place causing the sliding worm wheel 22 to be displaced along the drive shaft 20 in the direction of action arrow B into full engagement with the second drive worm wheel 28 (see FIG. 4). Once fully engaged, the actuator 32 is activated so that the plunger 38 is extended and the radiused end 40 of the plunger is brought into engagement with the terminal end 52 of the sliding worm screw 22 (note action arrow C). In this position, the radiused end 40 allows free rotation of the drive shaft 20 and the sliding worm screw 22 while holding the sliding worm screw 22 in the second position in full engagement with the second drive worm wheel 28.

As a consequence, the drive motor 18 may now be operated in a first direction to rotate the sliding worm screw 22 and the second drive worm wheel 28 in connection with the second drive cable or drive link 30 in order to move the roller shade 14 in a first or opening direction. Alternatively, the drive motor 18 may be driven in the opposite direction so that the transmission 17, as described above, connects the drive shaft 20 with the second drive cable or drive link 30 to move the roller shade 14 in a second or closing direction. See FIG. 5.

When one again wishes to adjust the position of the moon roof 12, one manipulates the moon roof control button 44. That causes the plunger 38 to retract, freeing the radiused end 40 from the terminal end of the sliding worm screw. The drive motor 18 is then energized to turn the elongated drive shaft 20 and the sliding worm screw 22 keyed thereto. As a result, the sliding worm screw 22 screws against the second drive worm wheel 28 that is held in place by friction in the second drive cable or drive link 30 causing the worm screw to be driven in a direction opposite to that illustrated in FIG. 3 until it is in full engagement with the first drive worm wheel 24. The plunger 38 of the actuator 32 is then reextended to bring the radiused end 40 into full engagement with the continuous channel 42 on the sliding worm screw 22 thereby holding the sliding worm screw in the first position in engagement with the first drive worm wheel 24. The drive motor 18 may then be energized to rotate in either direction in order to adjust the position of the moon roof 12 in the desired manner.

Consistent with the above description, a method is provided of operating a moon roof system 10 including a moon roof 12 and a roller shade 14. That method may be described as including the steps of selectively displacing the moon roof 12 between a first opened position and a first closed position and the roller shade 14 between a second opened position and a second closed position using the single drive motor 18. That method may further include the step of providing a sliding worm screw 22 on a drive shaft 20 of the single drive motor 18. In addition, the method may include the step of retaining, by an actuator 32, the sliding worm screw 22 at a first position as illustrated in FIG. 2 in order to displace the moon roof 12 between the first opened position and the first closed position. Further, the method may include the step of retaining, by the actuator 32, the sliding worm screw 22 at a second position on the drive shaft 20 as illustrated in FIG. 5 in order to displace the roller shade 14 between the second opened position and the second closed position. Still further, the method may include shifting the sliding worm screw 22 between the first position and the second position by releasing the actuator 32 and rotating the drive shaft 20 with the drive motor 18 in the manner illustrated in FIG. 3.

In summary, numerous benefits are provided by the new and improved moon roof system 10 incorporating the new and improved multifunction drive system 16. Advantageously, a single drive motor 18 is provided for driving both the first accessory or moon roof 12 and the second accessory or roller shade 14. This reduces the number and cost of parts for the system 10. It also reduces package space requirements. This effectively increases head room and provides designers with greater freedom to create sleeker and more stylish vehicles. Reduced space requirements also allow the moon roof to have a larger surface area or daylight opening and a larger open area when opened.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A multifunction drive system, comprising:
a single drive motor including a drive shaft;
a first drive link connected to a first accessory;
a second drive link connected to a second accessory; and
a transmission selectively connecting said drive shaft to said first drive link and said second drive link, said transmission including a first drive worm wheel connected to said first drive link, a second drive worm wheel connected to said second drive link and a sliding worm screw displaceable along said drive shaft between a first position in operative engagement with said first drive worm wheel and a second position in operative engagement with said second drive worm wheel.

2. The multifunction drive system of claim 1, wherein said transmission includes an actuator to retain said sliding worm screw in said first position or said second position along said drive shaft.

3. The multifunction drive system of claim 2, wherein said actuator comprises a linear actuator having a plunger with a radiused end.

4. The multifunction drive system of claim 3, wherein said sliding worm screw includes a continuous channel and said radiused end is engaged in said continuous channel to retain said sliding worm screw in said first position.

5. The multifunction drive system of claim 4, wherein said radiused end engages a terminal end of said sliding worm screw to retain said sliding worm screw in said second position.

6. A moon roof system, comprising:
a moon roof;
a roller shade; and
a multifunction drive system selectively displacing said moon roof between a first opened position and a first closed position and said roller shade between a second opened position and a second closed position using a single drive motor, said multifunction drive system including a first drive link connected to said moon roof, a second drive link connected to said roller shade and a transmission selectively connecting a drive shaft of said single drive motor to said first drive link and said second drive link, wherein said transmission includes a first drive worm wheel connected to said first drive link, a second drive worm wheel connected to said second drive link and a sliding worm screw displaceable along said drive shaft between a first position in operative engagement with said first drive worm wheel and a second position in operative engagement with said second drive worm wheel.

7. The moon roof system of claim 6, wherein said transmission includes an actuator to retain said sliding worm screw in said first position or said second position along said drive shaft.

8. The moon roof system of claim 7, wherein said actuator comprises a linear actuator having a plunger with a radiused end.

9. The moon roof system of claim 8, wherein said sliding worm screw includes a continuous channel and said radiused end is engaged in said continuous channel to retain said sliding worm screw in said first position.

10. The moon roof system of claim 9, wherein said radiused end engages a terminal end of said sliding worm screw to retain said sliding worm screw in said second position.

11. The moon roof system of claim 10, wherein said first drive link is a first drive cable and said second drive link is a second drive cable.

12. The moon roof system of claim 11, wherein said drive shaft includes an acircular cross section and said sliding worm screw includes a complementary acircular lumen receiving and engaging said drive shaft.

13. A method of operating a moon roof system including a moon roof and a roller shade, comprising:
   selectively displacing said moon roof between a first opened position and a first closed position and said roller shade between a second opened position and a second closed position using a single drive motor; and
   providing a sliding worm screw on a drive shaft of said single drive motor.

14. The method of claim 13, including retaining, by an actuator, said sliding worm screw at a first position along said drive shaft in order to displace said moon roof between said first opened position and said first closed position.

15. The method of claim 14, including retaining, by said actuator, said sliding worm screw at a second position along said drive shaft in order to displace said roller shade between said second opened position and said second closed position.

16. The method of claim 15, including shifting said sliding worm screw between said first position and said second position by releasing said actuator and rotating said drive shaft with said drive motor.

* * * * *